United States Patent [19]
Swenson

[11] Patent Number: 4,821,811
[45] Date of Patent: Apr. 18, 1989

[54] MOBILE SUPPORT FRAME

[75] Inventor: Kenneth C. Swenson, Crookston, Minn.

[73] Assignee: Gust Swenson & Sons, Inc., Crookston, Minn.

[21] Appl. No.: 174,363

[22] Filed: Mar. 28, 1988

[51] Int. Cl.$^4$ .............................................. A01B 73/00
[52] U.S. Cl. .................... 172/248; 280/43.23; 280/415.1; 172/443; 172/413
[58] Field of Search ............... 172/443, 248, 240, 413, 172/451, 776; 280/411 A, 411 R, 411 C, 415 R, 43, 23; 111/52, 66, 62

[56] References Cited
U.S. PATENT DOCUMENTS

| | | | |
|---|---|---|---|
| 3,610,661 | 10/1971 | Pierce | 172/248 |
| 4,049,061 | 9/1977 | van der Lely | 172/248 |
| 4,083,411 | 4/1978 | van der Lely | 172/248 |
| 4,204,699 | 5/1980 | Gustafson | 172/248 |
| 4,223,741 | 9/1980 | Blumhardt | 280/415 R |
| 4,272,097 | 6/1981 | Cornelius | 172/443 |

Primary Examiner—Richard J. Johnson
Attorney, Agent, or Firm—Herman H. Bains

[57] ABSTRACT

A towable support frame for supporting a pair of 12-row implements in side-by-side relation includes front and rear frame structures interconnected by longitudinal frame members. Front transport and rear wheel assemblies support the frame and implements for transport. Field wheel assemblies cooperate with the rear wheel assemblies for supporting the frame for travel during the field operation. The hitch mechanisms for the 12-row implements are mounted on the support frame at locations with respect to the transport and field wheel assemblies to provide optimum weight distribution.

6 Claims, 5 Drawing Sheets

MOBILE SUPPORT FRAME

This invention relates to a mobile towable support frame for supporting plurality of agricultural implements.

BACKGROUND OF THE INVENTION

Many agricultural operations, such as cultivating, planting, and the like, are performed by multi-row implements which are towed by large tractors. Heretofore, a 12-row implement was commonly used by many farmers. Presently, 24-row implements are available, and many farmers would prefer to use the 24-row implements, even though they now own 12-row implements. However, the cost of buying the larger 24-row implements is too prohibitive, when considering the capital investment involved with 12-row implements.

SUMMARY OF THE INVENTION

It is an object of this invention to provide a novel support frame, which is readily connectable to conventional tractors, and which may accommodate a pair of 12-row implements in side-by-side relation. The novel support frame is shiftable between transport and field positions to allow the implements to be readily transported or, alternatively, positioned for field use. The novel frame is provided with conventional 3-point hitches to accommodate substantially most conventional 12-row implements.

DESCRIPTION OF THE PREFERRED EMBODIMENT

Figure 1:
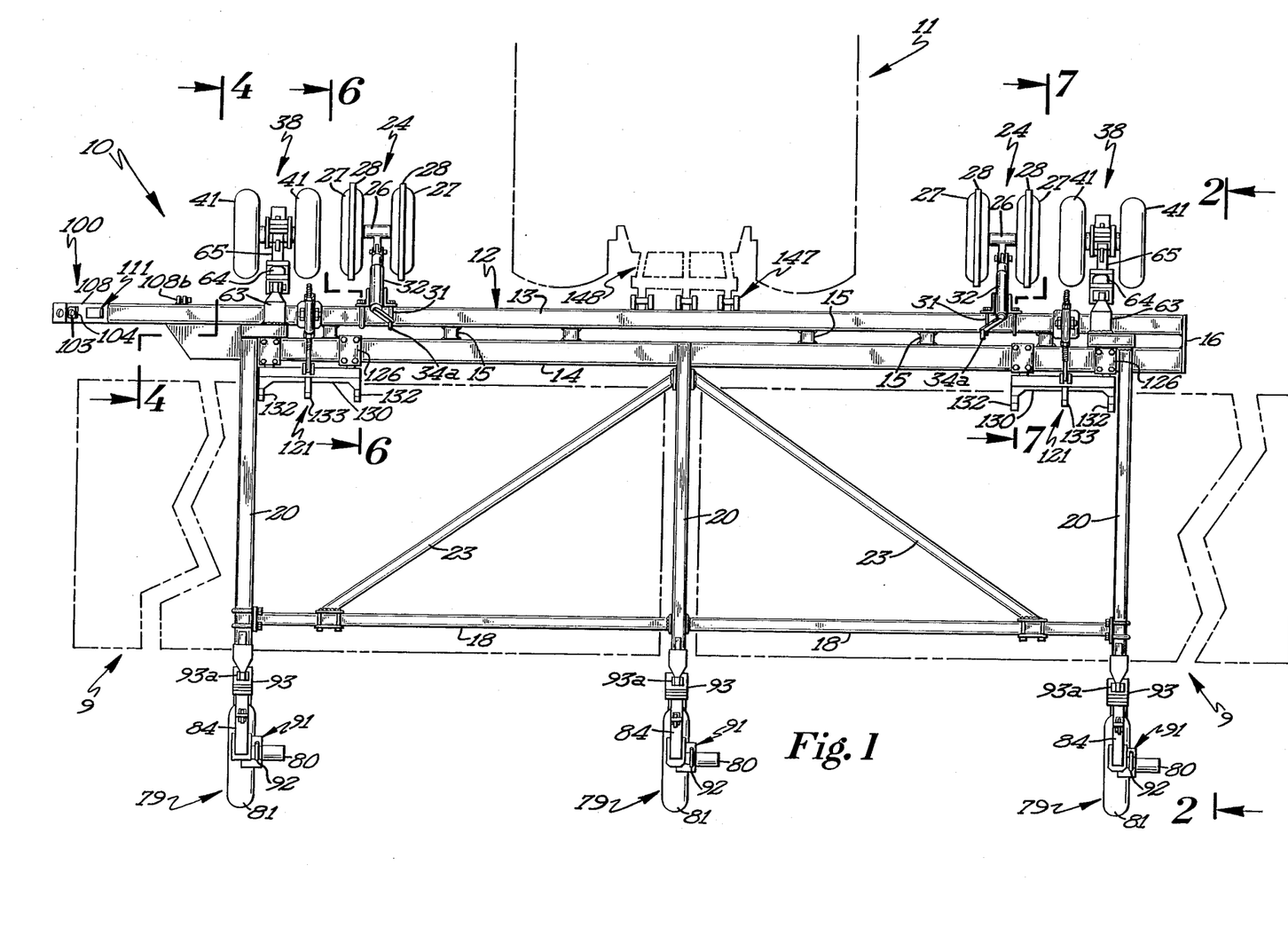
FIG. 1 is a top plan view of the novel support frame, with the tractor and implement frames illustrated in phantom line configuration.
Figure 2:
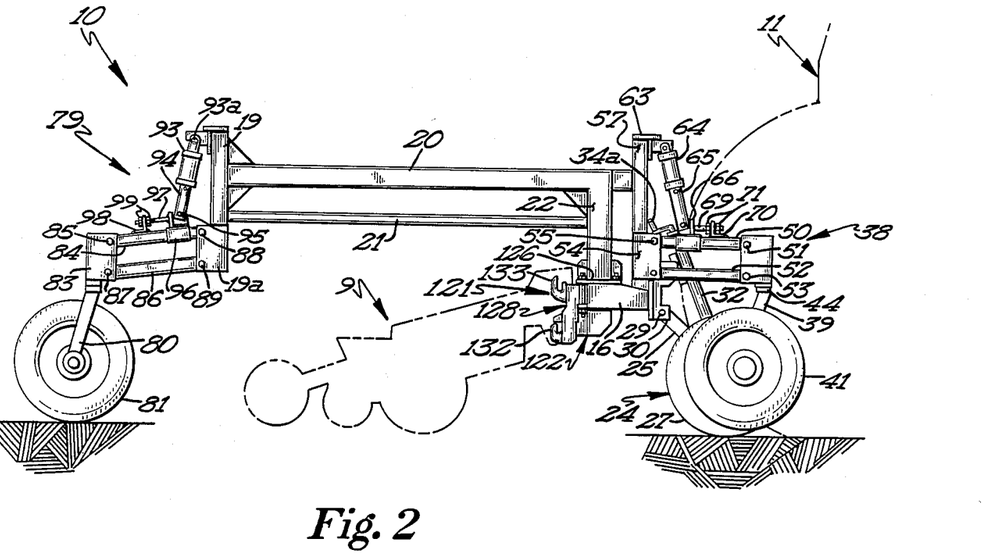
FIG. 2 is a side elevational view of the novel support frame taken approximately along the line 2—2 of FIG. 1, and looking in the direction of the arrows, and illustrating the support frame and implements in the field position.
Figure 3:
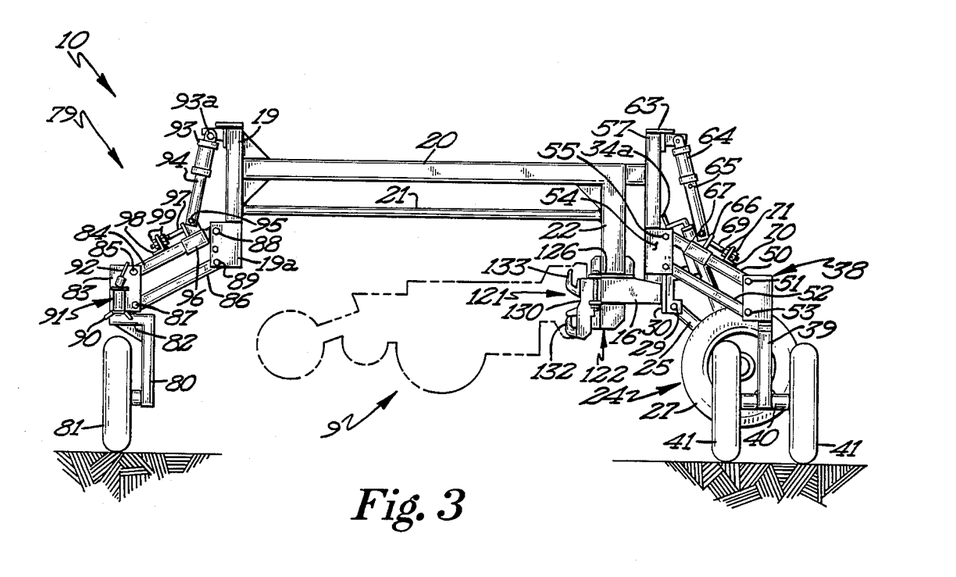
FIG. 3 is a side elevational view similar to FIG. 2, but illustrating the support frame and implements in the transport position.

Referring now to FIGS. 1–3, it will be seen that one embodiment of the novel support frame, designated generally by the reference numeral 10, is thereshown. It will be seen that the support frame 10 is illustrated in towing relation with respect to a tractor 11 depicted in phantom outline. The support frame 10 is adapted to support a pair of 12-row implements, designated generally by the reference numeral 9, in side-by-side relation. The implements 9, supported by the support frame 10, may include any conventional 12-row implement, such as planters, cultivators, and the like.

The support frame 10 includes a front frame structure 12, which is comprised of an elongate transversely extending front frame member 13 of rectangular cross-sectional configuration. Front frame structure 12 also includes an intermediate frame member 14, which is also of rectangular cross-sectional configuration and slightly larger in cross-sectional size than the front frame member 13. The front frame member and intermediate frame member are rigidly interconnected by a plurality of transversely spaced apart rigid connector bars 15. An end plate 16 interconnects one end of the front frame member and the intermediate frame member 14 together, as best seen in FIG. 1.

Figures 4, 5, 9:
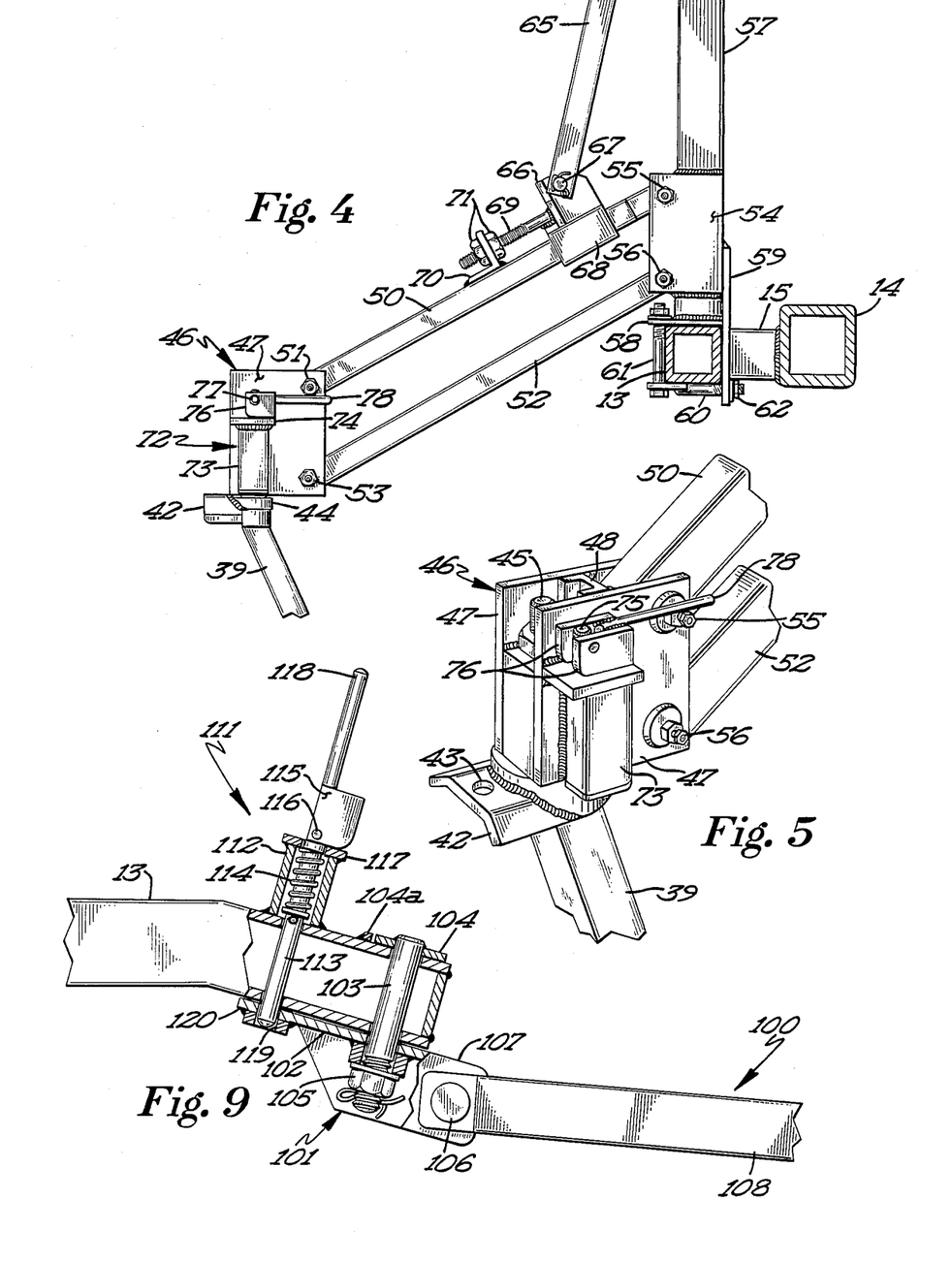
FIG. 4 is a cross-sectional view taken approximately along the line 4—4 of FIG. 1 and looking in the direction of the arrows.
FIG. 5 is an enlarged fragmentary perspective view of a portion of the front transport wheel assemblies illustrating details thereof.
FIG. 9 is a cross-sectional view taken approximately along the line 9—9 of FIG. 8 and looking in the direction of the arrows.

Referring now to FIGS. 1 and 9, it will be seen that the one end of the front frame member 13 projects beyond the corresponding end portion of the intermediate frame member 14 and includes a downwardly extending portion 17, the function of which will be more fully described hereinbelow.

The support frame also includes a transversely extending rear frame member 18, which is rigidly connected to a plurality of transversely spaced apart rigid rear vertical frame members 19. In the embodiment shown, there are three rear vertical frame members, each being connected at its upper end to the rear end of one of a plurality of upper longitudinal frame members 20. The rear vertical frame members 19 are each rigidly interconnected at their respective lower end portions to one of a plurality of lower longitudinal frame members 21. The front ends of each of the upper longitudinal frame members and each of the lower longitudinal frame members are rigidly interconnected to one of a plurality of front vertical frame members 22, as best seen in FIGS. 1–3. A pair of diagonal braces extend from the rear frame member 18 and are rigidly interconnected to the central upper longitudinal frame member 20 adjacent the front end of the latter.

Figure 6:
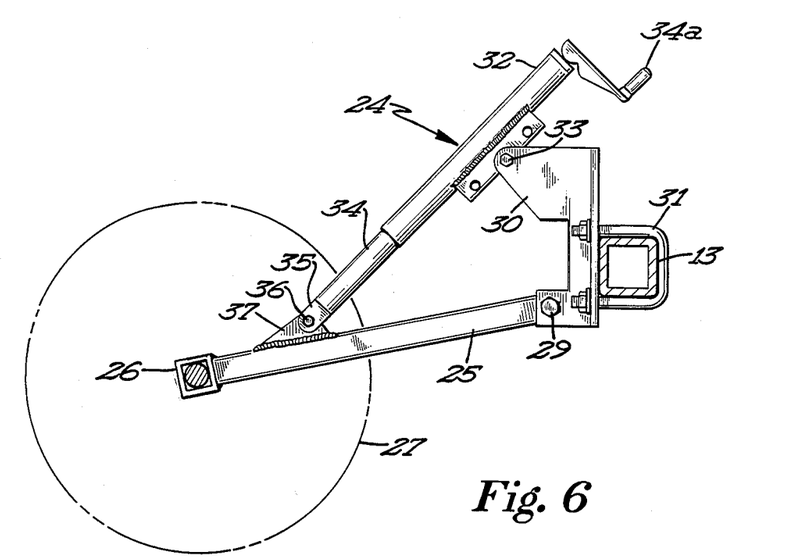
FIG. 6 is a cross-sectional view taken approximately along the line 6—6 of FIG. 1 and looking in the direction of the arrows.

Referring now to FIGS. 1 and 6, it will be seen that the support frame 10 is provided with a pair of field wheel assemblies 24, which are mounted on the front frame member 13, and which engage the surface of the ground when the support frame is in the field position. Each field wheel assembly 24 includes an elongate standard 25, which is provided with a transverse member 26 at its lower end portion, and into which are journaled the stub axles of a pair of similar ground engaging ground wheels 27. Each ground engaging field wheel 27 is provided with a conventional, annular, centrally located, radially extending guide portion 28, which serves to retain the ground engaging wheels in a furrow during the field operation. In the field position, each field wheel assembly projects downwardly and forwardly from the front frame structure 12, and it will be noted that the upper end portion of each elongate standard 25 is pivotally connected by a pivot 29 to a bracket 30. A pair of U-shaped clamping bolts, having retaining nuts, clamp each bracket 30 to the front frame structure 12, as best seen in FIG. 6.

Each field wheel assembly 24 is provided with an elongate outer sleeve 32, which is pivoted by a pivot 33 to the associated bracket 30. An elongate internally threaded sleeve 34 telescopically engages the sleeve 32 and projects therethrough. The inner sleeve 34 is provided with a clevis 35 at its forward or lower end, which is pivotally connected to a bracket 37 rigidly affixed to the associated wheel standard 25. A handle 34a, having a threaded extension, is rotatably secured to the outer sleeve 32 and threadedly engages the upper sleeve 34. The handle 34a, when manually turned, will raise and lower the field wheel assembly.

The support frame 10 is also provided with a pair of transversely spaced apart front transport wheel assemblies 38, each including an elongate standard 39, which is provided with a transverse member 40 at its lower end, and in which is journaled the stub axles of a pair of ground engaging transport wheels 41.

Referring now to FIGS. 1, 4, and 5, it will be seen that the upper end of each wheel standard 37 is provided with a locking plate 42 having an opening therein. A bearing 44 is positioned upon the locking plate 42, and a pivot bolt 45 is rigidly affixed to the upper end of the standard and projects through the bearing and through a bracket assembly 46.

The bracket assembly 46 includes a pair of flat substantially vertically disposed side plates 47 which are rigidly interconnected intermediate their front and back edges by a transverse U-shaped plate 48. A front plate 49 rigidly extends between and interconnects the side plates adjacent their front edges, as best seen in FIG. 5. The pivot bolt 45 projects upwardly between the side plates, and is provided with a retainer nut, which engages an upper top plate of the bracket assembly.

One end of an elongate upper link 50 extends between the side plates 47 and is pivotally connected thereto by a pivot 51. Similarly, the lower or front end of a lower link 52 projects between and is pivotally connected to the plates 47 by a pivot 43.

The upper end portion of the upper link 50 extends between a pair of plates 54 and is pivotally connected thereto by a pivot 55. The upper end of the lower link 52 is pivotally connected by pivot 56 to the plates 54. The respective lower end portions of the plates 54 are rigidly secured to a top plate 58 and to a back plate 59, as best seen in FIG. 4. The top plate 58 and the back plate 59 engage the front frame member 13. A bottom plate 60 is positioned against the lower surface of the front frame member 13, and a nut and bolt assembly 61 clamps the top and bottom plates against the front frame member. The bottom plate is provided with a pair of threaded bolts, which are integrally formed therewith, and which extend through openings in the back plate and are clamped thereagainst by a nut to clamp the back plate against the front frame member. The lower end of a vertically extending post 57 is positioned between and is rigidly connected to the plates 54 and projects upwardly therefrom.

A hydraulic cylinder 64 is pivotally connected to a bracket 63 secured to the upper end of each post 57, as best seen in FIGS. 2 and 3. The hydraulic cylinder is provided with a piston, which is secured to a piston rod 65 which extends outwardly therefrom and is pivotally secured to a bracket 66 by a pivot 67. The bracket 66 is rigidly secured to a sleeve 68, which is slidable on the upper link 50. An elongate threaded member 69 is secured to the bracket 66 and projects therefrom and extends through an opening in a bracket 70, which is rigidly affixed to the upper link 50, as best seen in FIG. 4. Suitable nuts 71 secure the rod to the bracket 70. It will be seen that, by adjusting the position of the sleeve 68 relative to the link 50, the amount of movement allowed by the hydraulic piston and cylinder unit may be variously adjusted with respect to raising and lowering the front and transport wheel assemblies.

Since the front transport wheels 48 may castor, it is necessary to lock these wheels in the transport position. Therefore, each front transport wheel assembly is provided with a cam lock mechanism 72, which is best illustrated in FIGS. 4 and 5. Each cam lock mechanism 72 includes a housing 73, which is rigidly secured to one of the side plates 47 and projects outwardly therefrom. The housing is provided with a top plate 74 having an opening therein through which projects the upper end of a spring urged plunger 75 (see FIG. 9). Means are provided for shifting the plunger 75 downwardly and include a pair of laterally spaced apart cam elements 76 positioned on opposite sides of the plunger 75 and pivotally connected thereto by a pivot 77. One end of an elongate handle 78 is rigidly secured to the cam elements 76 to facilitate shifting of the cam elements to cause the plunger 75 to be moved downwardly. The plunger 75 will be urged upwardly against the bias of the spring (not shown) and may be forcibly urged downwardly into the opening 43 when the latter is positioned below the plunger. In this regard, when the ground engaging transport wheels are shifted to the transport position, the locking plate will be disposed to position the opening 43 below the plunger, thereby allowing the transport wheels to be locked in the transport position.

Referring again to FIGS. 2 and 3, it will be seen that the support frame 10 also includes a plurality of rear wheel assemblies 79, which support the rear portion of the frame in the field and transport positions. In the embodiment shown, there are three rear wheel assemblies 79, and each is attached to the lower end of one of the vertical posts 19. Each rear wheel assembly 79 includes a vertical wheel standard 80 having a ground engaging wheel 81 journaled in the lower end portion thereof. The standard 80 has a transverse portion 82 affixed to the upper end thereof, and the transverse portion has a pivot bolt (not shown) which projects between and is secured to a pair of vertical plates 83 of a bracket assembly, which is similar in construction to the bracket assembly 46 for the front transport wheels. The standard 80 is provided with a pivot bolt (not shown), which is pivoted to the bracket assembly 83 to permit pivoting of the ground engaging wheel of each rear wheel assembly about a vertical axis.

One end of an elongate upper link 84 extends between and is pivoted to the plates 83a of the bracket assembly 83 by a pivot 85. One end of an elongate lower link 86 is pivotally connected to the bracket assembly by a pivot 87.

It will be seen that the lower end portion of each rear vertical post 19 is provided with a pair of bracket plates 19a, and it will also be noted that the upper end of the upper link 84 is pivotally connected to the bracket plates 19a by a pivot 88. Similarly, the upper end of the lower link 86 is also pivotally connected to the plates 19a by a pivot 89. Each rear wheel assembly 79 is provided with a locking plate 90 secured to the upper end portion of the standard 80, and each locking plate is provided with an opening therein in the manner of the locking plate for each front transport wheel assembly.

Each rear wheel assembly is provided with a cam lock mechanism 91, which is identical in construction and operation to the cam lock mechanism for the front transport wheel assembly. It is pointed out that the cam lock mechanism includes a pair of cams secured to a handle 92, which is connected to a spring urged plunger that may be shifted to lock the rear transport wheels in the transport position.

Means are provided for raising and lowering each rear wheel assembly, and this means includes a hydraulic cylinder 93, which is pivotally connected to a bracket 93a secured to the upper end of the associated vertical post 19. Each hydraulic cylinder is provided with a piston having a piston rod 94 secured thereto and projecting therefrom. The outer end of each piston rod 94 is pivotally connected by a pivot 95 to a sleeve 96 slidable on the upper link 84. Each sleeve is provided with a bracket through which the piston rod 94 is pivoted. A threaded rod 97 is secured to the bracket for the sleeve 96, and the threaded rod projects through a bracket 98 and is secured against movement relative thereto by nuts 99. It will be seen that, by adjusting the threaded rod and associated sleeve, the amount of vertical movement of the rear wheel assemblies may be variously adjusted.

Figure 8:
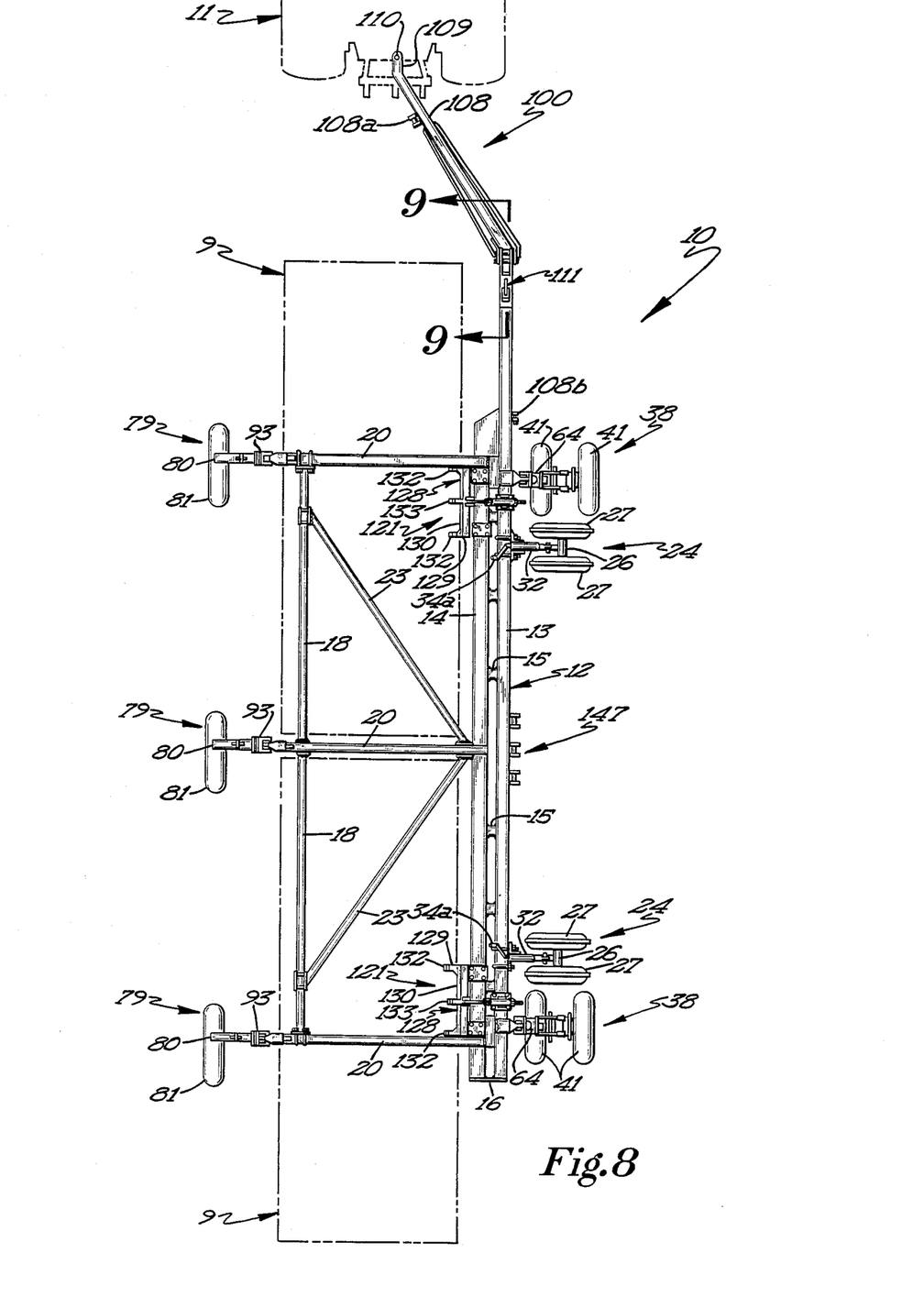
FIG. 8 is a top plan view of the novel support frame in the transport position.

Referring now to FIGS. 8 and 9, it will be seen that the support frame is provided with a drawbar and hinge assembly 100, which is pivotally attached to the downwardly extending portion 17 of the front frame member 13. The drawbar and hitch assembly 100 includes a pivot housing 101, which is positioned below the downwardly extending portion 17 adjacent the front end thereof. The pivot housing is provided with a top plate 102 having an opening therein through which projects a vertical pivot 103. The vertical pivot also projects through the downwardly projecting end portion 17 of the front frame member 13 and is secured against movement relative thereto by a cap plate 104. A nut 105 and retainer pin secure the pivot bolt to the pivot housing and permit relative pivotal movement between the drawbar and hitch assembly with respect to the support frame 10.

A transverse pivot 106 extends through and is secured to the side plates 107 of the pivot housing 101 and also extends through an opening in the rear end portion of an elongate drawbar 108. The drawbar is thereby connected to the pivot housing 101 for vertical movement therebetween about a horizontal axis. It will be noted that the front end portion of the drawbar 108 is offset, as at 109, and is provided with a clevis at its front end, which is pivotally connected to the tractor hitch by a vertical pivot 110 to permit relative pivotal movement therebetween. When the support frame is in the travel position, as illustrated in FIG. 8, the drawbar and hitch assembly 100 are used to tow the support frame and implements supported thereby from one location to another.

When the support frame is in the field position, the drawbar and hitch assembly 100 may be swung below the front frame member 13 and secured thereto in a well-known manner. However, when the drawbar and hitch assembly 100 are in the position illustrated in FIG. 8, the drawbar and hitch assembly must be locked in the extended transport position.

To this end, a cam lock mechanism 111 is provided and is identical in construction to the cam locks used with respect to the front and rear transport wheel assemblies. The cam lock mechanism 111 includes a housing 112 secured to the upper surface of the end portion 17 of the front frame member 13. A locking bolt 113 projects through the housing, including the top plate 117 thereof, and through openings in the end portion 17 of the front frame member. A helical spring 116 is positioned around the locking bolt 113 and is compressed when the locking bolt is urged into the locking position, as illustrated in FIG. 9. A pair of cam elements 115 are secured to the upper end portion of the locking bolt 113 by a pivot 116 and bear against the top plate 117. A handle 118 is secured to the cam elements and projects therefrom to facilitate shifting of the locking bolt between release and locking positions. When the locking bolt 113 is in the locking position, the bolt will project through an opening 119 in an extension 120 of the top plate 102 for the pivot housing 101. It will be seen that the locking bolt may be released by shifting the handle and cam elements to retract the locking bolt from locked relation with the pivot housing 101.

Figure 7:
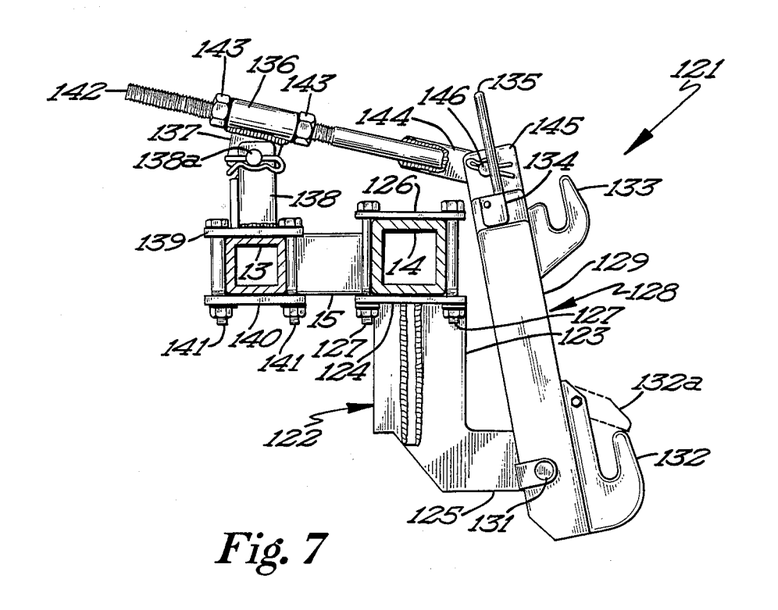
FIG. 7 is a cross-sectional view taken approximately along the line 7—7 of FIG. 1 and looking in the direction of the arrows.

Referring now to FIGS. 1 and 7, it will be seen that the support frame 10 is provided with a pair of 3-point hitch mechanisms 121 for attachment to the 3-point hitch mechanisms on the implements 9. Each hitch mechanism 121 is located adjacent one end of the support frame, and each is positioned between and just rearwardly of one of the front transport wheel assemblies and one of the field wheel assemblies, as best seen in FIG. 1. It will also be noted that each of the outermost rear wheel assemblies is positioned rearwardly of one of the front transport wheel assemblies and rearwardly of the associated 3-point hitch mechanism. This arrangement permits effective weight distribution of the implement supported by the support frame.

It will be seen that each hitch mechanism 21 includes a fixed frame 122, which is comprised of a pair of vertical fixed frame elements 123, which are interconnected at their respective upper ends by a transverse plate 124. Each vertical frame element 123 also includes a forwardly extending portion 125. The fixed hitch frame 122 is secured to the intermediate frame member 14 by a pair of clamping plates 126 and nut and bolt assemblies 127.

Each hitch mechanism 121 also includes an inverted U-shaped movable hitch frame 128, which includes a pair of vertical frame elements 129 rigidly secured at their respective upper ends by a transverse frame element 130. The vertical frame elements 129 are each pivoted to one of the forwardly extending portions 125 for each vertical frame element 123 by a pivot 131 to permit pivoting of the movable hitch frame 128 relative to the fixed frame 122 about a horizontal transverse axis.

It will also be noted that each vertical hitch frame element 129 is provided with a hook-shaped member 132 of well-known construction, each having a keeper dog (not shown) which overlies the cooperating hitch element on the implement when the implement is hitched to the support frame 10. The movable hitch frame is also provided with a central hook member 133, which is rigidly affixed to the transverse frame element 130 at the central portion thereof. The keepers for each hook-shaped member are actuated by a cam actuating mechanism 134 in a well-known manner. In this regard, when the cam actuating mechanism 134 is in the position illustrated in FIG. 7, the keeper dogs for each hook member will be in the retracted position and, when the handle 135 of each cam actuating mechanism 134 is swung in a clockwise direction, as viewed in FIG. 7, the keeper dogs will be extended to overlie the cooperating hitch element on the implement. It is pointed out that the implement will also have a cooperating 3-point hitch mechanism which will respectively engage the hook members 132 and 133.

Means are provided for adjusting the movable hitch frame relative to the fixed hitch frame, and this means includes an elongate sleeve 136 having a depending bracket affixed thereto and being pivotally connected to a pair of closely spaced apart posts 138 by a pivot 138a. The posts 138 are rigidly affixed to a top clamping plate 139, which engages the front frame member 13 and is clamped thereagainst by a lower clamping plate 140 and nut and bolt assemblies 141. An elongate threaded rod extends through the sleeve 136 and is secured in a predetermined position relative thereto by nuts 143. The rear end of the rod 142 has an arm 144 rigidly affixed thereto, which projects between and is pivotally connected to a pair of brackets 145 by a pivot 146. The brackets 145 are rigidly affixed to the transverse frame element 130 adjacent the central portion thereof. It will be seen that, by adjusting the position of the elongate rod 142 relative to the sleeve 136, the angle of the movable hitch frame relative to the fixed hitch frame may be readily adjusted.

It will also be noted that the support frame 10 is provided with a conventional 3-point hitch mechanism 147 affixed to the front frame member 13 at approximately the mid-portion of the support frame 10, as best seen in FIG. 1. The 3-point hitch 147 is connectable to the conventional 3-point hitch 148 of the tractor 11 in a well-known manner to permit the tractor to tow the support frame and implements carried thereby.

In use, two 12-row implements, such as the implement 9, will be connected to the frame 10 by means of the 3-point hitch mechanism on the implement and the 3-point hitch mechanism 121 on the frame. The 3-point hitch mechanism on the frame may be adjusted as desired to accommodate the particular implement. The 3-point hitch mechanism 147 on the support frame 10 will be connected to the tractor hitch mechanism 148 in a well-known manner.

During the field operation, both the front and rear transport wheel assemblies will be shifted by their associated hydraulic cylinder and piston units to lower the frame so that the field wheel assemblies 24 engage the surface of the ground. This will properly position the implements 9 for field operation and the front transport wheel assemblies may be positioned above the surface of the ground or may slightly engage the surface of the ground, but will not bear the weight of the support frame and implements, since this will be done by the field wheel assemblies and the rear transport wheel assemblies.

It is again pointed out that the hitch between the frame 10 and each 12-row implement 9 is positioned rearwardly and in general alignment with one of the front transport wheel assemblies or one of the field wheel assemblies. With this arrangement, the weight is evenly distributed with respect to the two 12-row implements and a major portion of the weight will be borne by the field wheel assemblies during the field operation. It is pointed out that the drawbar and hitch assembly 100 will be swung below the front frame member 13 and secured thereto during the field operation.

During the field operation, the front and rear transport wheel assemblies will remain unlocked and will be free to pivot about their vertical axis during movement of the support frame 10. However, when the support frame is shifted to the transport condition, the front and rear transport wheels will be shifted to raise the frame so that the field wheel assemblies 24 will be disposed above the ground surface. The implement 9 will also be elevated above the ground surface, and the front and rear transport wheels will be shifted to the position illustrated in FIG. 8 and the respective cam lock mechanisms actuated to lock the transport wheels in this position.

The drawbar and hitch assembly will be disengaged from its inoperative position below the frame member 13 and will be extended to the position illustrated in FIG. 8 and attached to the corresponding hitch mechanism on the tractor. The cam lock mechanism for the drawbar and hitch assembly 100 will be shifted to lock the drawbar in the position illustrated in FIG. 9. With this arrangement, the support frame and implement supported thereby may be easily towed by the tractor from one location to another.

From the foregoing, it will be seen that the novel support frame permits the farmer or agricultural operator to utilize two 12-row implements in side-by-side relation to thereby achieve the functional effect of a 24-row implement without incurring the cost in purchasing a 24-row implement.

It will be seen from the foregoing description that the novel support frame is arranged and constructed to evenly distribute the weight of two such 12-row implements, while permitting effective operation of the implements in their intended manner.

Thus, it will be seen that I have provided a novel support frame of efficient construction and operation, which provides great economy to farmers desiring to increase their operational productivity.

What is claimed is:

1. A mobile support frame for use in attaching and supporting a pair of towed multi-row implements, such as planters, cultivators, or the like, to a tractor, comprising:

a front frame structure, an elongate transversely extending rigid rear frame structure, a plurality of transversely spaced apart longitudinal frame members rigidly interconnecting the front and rear frame structures, a pair of transversely spaced apart hitch mechanisms, each being mounted on said front frame structure adjacent one end of the latter, said hitch mechanisms being disposed in side-by-side relation and each being releasably connectable to a cooperating centrally located hitch mechanism on one of a pair of multi-row implements whereby a pair of implements may be mounted on a frame in side-by-side relation, a pair of transversely spaced apart field wheel assemblies mounted on said front, frame structure and positioned forwardly thereof, and each including a pair of ground-engaging wheels, means for vertically adjusting said field wheel assemblies, a pair of transversely spaced apart front transport wheel assemblies, linkage means interconnecting said front transport wheel assemblies with said front frame structure to permit relative vertical shifting between the frame and said transport wheel assemblies, each transport wheel assembly being disposed adjacent one of said field wheel assemblies, each hitch mechanism on said front frame, assembly being positioned directly rearwardly of a field wheel assembly and a front transport wheel assembly, and a plurality of rear wheel assemblies, linkage means connecting said rear wheel assembly with said rear frame structure, each of a pair of said rear wheel assemblies being disposed in general alignment with one of said field wheel assemblies, power means interconnecting on said front and rear frame structures, respectively, with the linkage means for the rear wheel assemblies and the front transport wheel assemblies, respectively, and being operable to shift the frame and implements mounted thereon between transport and field positions.

2. The mobile support frame as defined in claim 1 wherein said front frame structure includes elongate substantially straight front and intermediate frame members disposed in closely adjacent parallel relation with respect to each other, means rigidly connecting said front and rear frame members together, said front transport and field wheel assemblies being mounted on said front frame member, and said hitch mechanisms being mounted on said intermediate frame member.

3. The mobile support frame as defined in claim 2 wherein said front frame member has one end portion thereof projecting beyond the corresponding end portion of said intermediate frame member, an elongate drawbar, means pivotally connecting one end of said drawbar to said projecting end portion of the front frame member and permitting pivotal movement of the drawbar about vertical and horizontal axes, and means at the other end of said drawbar for connection to a hitch on the tractor to permit the frame to be towed by a tractor when in the transport position.

4. The mobile support frame as defined in claim 3 and releasable lock means for locking the drawbar to the front frame member against horizontal movement about a vertical axis when the support frame is in the transport position.

5. The mobile support frame as defined in claim 2 and a plurality of releasable lock mechanisms, each being mounted on one of said front transport and rear wheel assemblies, and each being operable to lock the associated front transport and rear wheel assemblies against pivotal movement about a vertical axis in the transport position, wherein the axis of rotation of the front transport and rear wheel assemblies is normal to the direction of travel and parallel to the longitudinal frame members.

6. The mobile support frame as defined in claim 5 and a plurality of adjustment mechanisms on each of said front transport and rear wheel assemblies for adjusting the respective positions thereof when the latter are shifted between field and transport positions.

* * * * *